(12) United States Patent
Lu et al.

(10) Patent No.: US 8,533,572 B2
(45) Date of Patent: Sep. 10, 2013

(54) ERROR CORRECTING CODE LOGIC FOR PROCESSOR CACHES THAT USES A COMMON SET OF CHECK BITS

(75) Inventors: Shih-Lien Lu, Portland, OR (US); Wei Wu, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 267 days.

(21) Appl. No.: 12/890,468

(22) Filed: Sep. 24, 2010

(65) Prior Publication Data

US 2012/0079342 A1 Mar. 29, 2012

(51) Int. Cl.
*G11C 29/00* (2006.01)
*H03M 13/00* (2006.01)

(52) U.S. Cl.
USPC .......................................... 714/773; 714/774

(58) Field of Classification Search
USPC ................................. 714/773, 774
See application file for complete search history.

(56) References Cited

U.S. PATENT DOCUMENTS

| | | | | |
|---|---|---|---|---|
| 4,486,882 A * | 12/1984 | Piret et al. | | 714/788 |
| 4,953,164 A * | 8/1990 | Asakura et al. | | 714/754 |
| 5,586,303 A * | 12/1996 | Willenz et al. | | 711/172 |
| 5,604,753 A * | 2/1997 | Bauer et al. | | 714/763 |
| 5,745,913 A * | 4/1998 | Pattin et al. | | 711/105 |
| 6,038,693 A * | 3/2000 | Zhang | | 714/768 |
| 6,269,465 B1 | 7/2001 | Hill et al. | | |
| 6,412,091 B2 | 6/2002 | Hill et al. | | |
| 6,480,975 B1 * | 11/2002 | Arimilli et al. | | 714/52 |
| 6,560,693 B1 * | 5/2003 | Puzak et al. | | 712/207 |
| 6,591,393 B1 * | 7/2003 | Walker et al. | | 714/763 |
| 6,631,454 B1 * | 10/2003 | Sager | | 711/167 |
| 6,772,383 B1 * | 8/2004 | Quach et al. | | 714/746 |
| 6,848,070 B1 * | 1/2005 | Kumar | | 714/758 |
| 6,848,071 B2 * | 1/2005 | Chaudhry et al. | | 714/763 |
| 6,968,476 B2 * | 11/2005 | Barowski et al. | | 714/15 |
| 7,127,643 B2 * | 10/2006 | Tremblay et al. | | 714/52 |
| 7,376,877 B2 * | 5/2008 | Quach et al. | | 714/746 |
| 7,475,321 B2 | 1/2009 | Gurumurthi et al. | | |
| 7,496,826 B2 | 2/2009 | Holman | | |
| 7,606,980 B2 | 10/2009 | Qureshi et al. | | |
| 7,607,071 B2 | 10/2009 | Neefs et al. | | |
| 7,647,536 B2 | 1/2010 | Dempsey et al. | | |
| 8,276,039 B2 * | 9/2012 | Wuu et al. | | 714/758 |
| 2002/0157056 A1 * | 10/2002 | Chaudhry et al. | | 714/763 |
| 2003/0093726 A1 * | 5/2003 | Tremblay et al. | | 714/52 |

(Continued)

*Primary Examiner* — Joseph D Torres
(74) *Attorney, Agent, or Firm* — Blakely, Sokoloff, Taylor & Zafman LLP (57) ABSTRACT

A processor or other apparatus of an aspect may include a first cache, a first error correction code (ECC) logic for the first cache, a second cache, and a second ECC logic for the second cache. The apparatus may also include an interconnect coupled with or between the first cache and the second cache. The interconnect is operable to transmit data and also check bits corresponding to the data between the first cache and the second cache. A method of an aspect may include accessing data, and check bits corresponding to the data, from a first cache. The data and the check bits may be transmitted over an interconnect from the first cache to a second cache. The data and the check bits may be stored in the second cache. Other methods, apparatus, and systems are also disclosed.

8 Claims, 7 Drawing Sheets

(56) References Cited

U.S. PATENT DOCUMENTS

| | | | |
|---|---|---|---|
| 2004/0006669 A1* | 1/2004 | Endo et al. | 711/128 |
| 2004/0199851 A1* | 10/2004 | Quach et al. | 714/758 |
| 2008/0163008 A1* | 7/2008 | Jacob | 714/699 |
| 2010/0146368 A1 | 6/2010 | Chishti et al. | |
| 2010/0223525 A1* | 9/2010 | Wuu et al. | 714/755 |
| 2011/0161783 A1 | 6/2011 | Somasekhar | |
| 2011/0289380 A1 | 11/2011 | Wilkerson | |
| 2012/0159283 A1 | 6/2012 | Lu | |

\* cited by examiner

ERROR CORRECTING CODE LOGIC FOR PROCESSOR CACHES THAT USES A COMMON SET OF CHECK BITS

BACKGROUND

1. Field

Various different embodiments relate to processor caches. In particular, various different embodiments relate to error correction code logic for processor caches that uses a common set of check bits, to processors having such logic, to methods performed by such processors, or to systems having such processors.

2. Background Information

Processors typically have one or more caches. The caches may represent relatively small and fast types of memories that are closer to a core or cores of the processor than main memory, and that may be used to store data from frequently used memory locations. When the processor wants to read data from or write data to a location in the main memory, it may first check to see if a copy of the data is located in the cache. If the data is found to be located in the cache, then the processor may quickly access the data in the cache. This is relatively faster or has lower latency than accessing the main memory. As a result, accesses to the cache help to reduce the average time or latency of accessing the data, which may help to improve processor performance.

Processors often provide caches at more than one level. The levels differ in their relative closeness to one or more cores of the processor. For example, a first level of cache (e.g., a level 1 or L1 cache) may be closest to a given core, a second level of cache (e.g., a level 2 or L2 cache) may be next closest to the core, and a third level of cache (e.g., a level 3 or L3 cache) may be the next closest to the core, and so on. Caches closer to the core generally tend to be smaller than caches farther from the core. In addition, in processors with multiple cores, the caches may either be dedicated to a given core, or shared by multiple cores. For example, a multi-core processor may have a plurality of first level caches that are each dedicated to a different core, and shared second level cache that is shared by each of the different cores. Furthermore, caches may be either monolithically integrated on-die with a core, or off-die (e.g., attached to a motherboard). Commonly, the caches at levels relatively closer to the core are monolithically integrated on-die, whereas the caches at levels farther from the core may either be on-die or off-die.

The caches of processors are often protected by error correcting codes (ECCs). In addition, different caches may be protected by different ECC schemes, such as schemes providing relatively more or less error correction.

BRIEF DESCRIPTION OF THE SEVERAL VIEWS OF THE DRAWINGS

The invention may best be understood by referring to the following description and accompanying drawings that are used to illustrate embodiments of the invention. In the drawings.

DETAILED DESCRIPTION

In the following description, numerous specific details, such as particular cache configurations, particular types of error correction codes, particular numbers of data and check bits, and the like, are set forth. However, it is understood that embodiments of the invention may be practiced without these specific details. In other instances, well-known circuits, structures and techniques have not been shown in detail in order not to obscure the understanding of this description.

Figure 1:
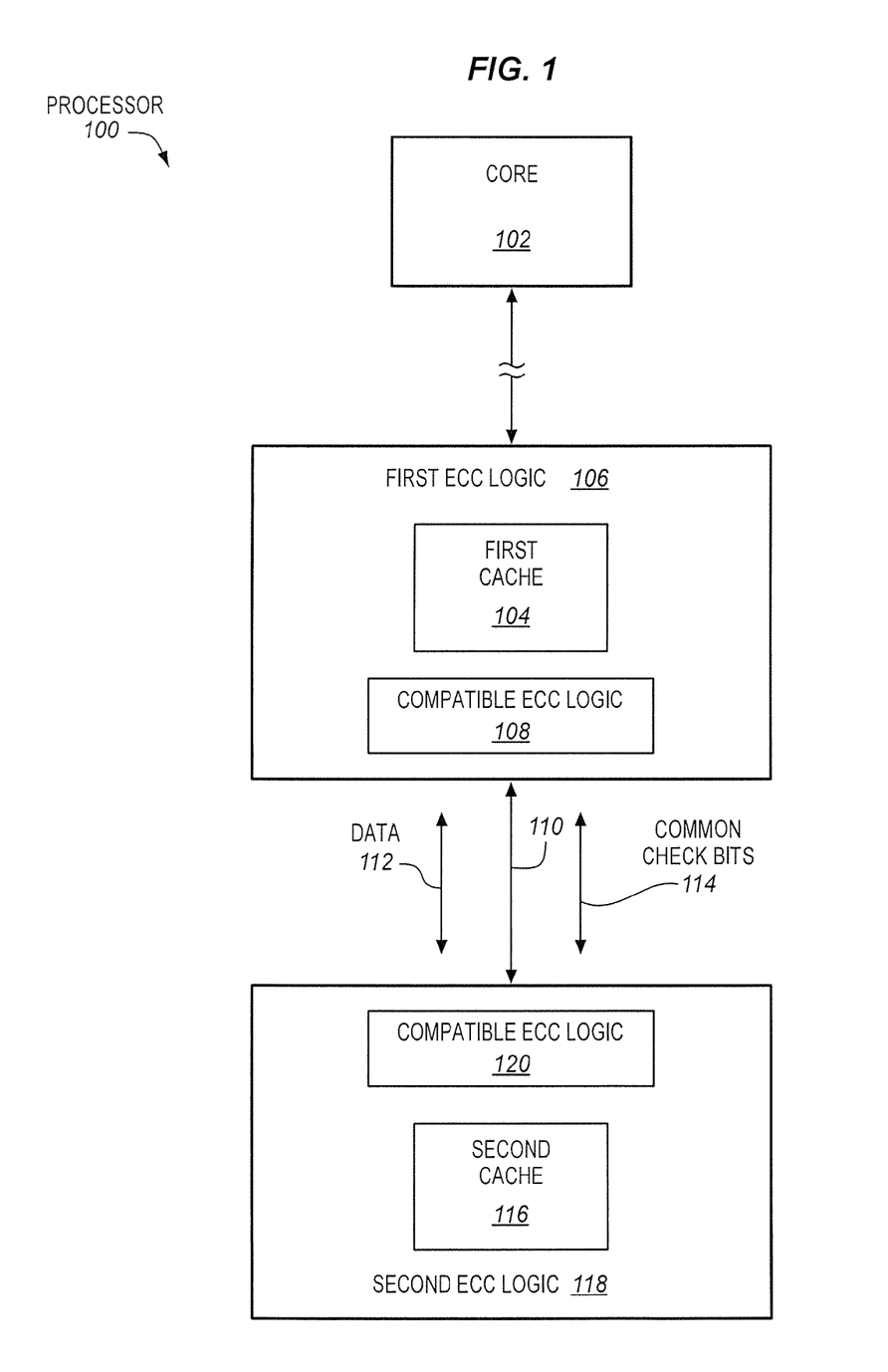
FIG. 1 is a block diagram of an embodiment of a processor.

FIG. 1 is a block diagram of an embodiment of a processor 100. In one or more embodiments, the processor may be a general-purpose processor, such as, for example, one of the general-purpose processors manufactured by Intel Corporation, of Santa Clara, Calif., although this is not required. Alternatively, the processor may be a special-purpose processor. Representative examples of suitable special-purpose processors include, but are not limited to, network processors, communications processors, cryptographic processors, graphics processors, co-processors, embedded processors, and digital signal processors (DSPs), to name just a few examples. To avoid obscuring the description, a simplified processor has been shown, although it is understood that the processor includes other components whose description is not necessary for understanding the present description.

The processor has a core 102 (and optionally one or more other cores), a first cache 104 coupled with the core, and a second cache 116 coupled with the first cache, for example by a cache bus or other interconnect 110. The first cache is relatively closer to the core than the second cache, and the second cache is relatively closer to main memory than the first cache. The first cache is not necessarily the closest cache level to the core, for example there may be one or more other levels of cache closer to the core than the first cache (e.g., logically between the core and the first cache). Commonly, the first cache which is closer to the core may tend to be smaller than the second cache which is farther from the core, although this is not required. The processor may optionally have one or more other caches at one or more other levels. In addition, although the illustration shows caches at different levels, the scope of the invention is not limited in this respect.

The first cache 104 is protected by, or has associated therewith, a corresponding first error correction code (ECC) logic 106, which is based on a first ECC scheme. Similarly, the second cache 116 is protected by, or has associated therewith, a corresponding second ECC logic 118, which is based on a second ECC scheme. Commonly, smaller caches tend to have relatively lower levels of ECC protection than larger caches, due in part to the likelihood of errors generally being lower. Accordingly, in one or more embodiments, the second ECC logic/scheme may provide a higher level of protection than the first ECC logic/scheme, although this is not required. For example, in one particular embodiment, the second ECC logic/scheme may provide higher-bit error correction/detection (e.g., Double-bit Error Correction Triple-bit Error Detection (DECTED)), whereas the first ECC logic/scheme may provide lower-bit error correction/detection (e.g., Single-bit Error Correction Double-bit Error Detection (SECDED)), although this is not required.

The first ECC logic 106 has first compatible ECC logic 108 and the second ECC logic 118 has second compatible ECC logic 120. The first compatible ECC logic is compatible with the second compatible ECC logic to allow common check bits 114 generated based on or otherwise corresponding to data 112 to be transmitted between and used by both the first ECC logic 106 and the second ECC logic 118. The common check bits 114 as well as the data 112 may be transmitted between the first and second ECC logics over a cache bus, other bus, or other interconnect 110.

Figure 2:
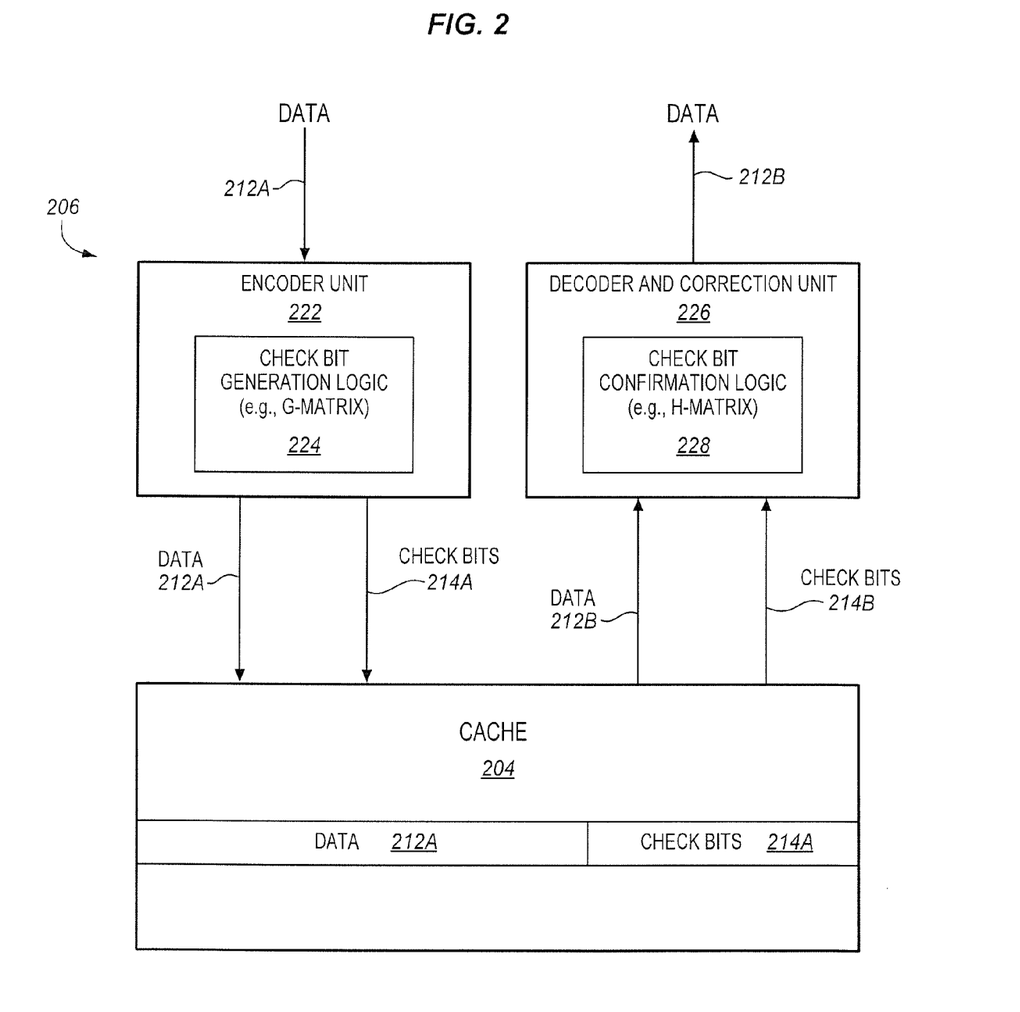
FIG. 2 is a block diagram of an embodiment of a cache and corresponding ECC logic for the cache.

FIG. 2 is a block diagram of an embodiment of a cache 204 and corresponding ECC logic 206 for the cache. The ECC logic is coupled with the cache and may be used to protect against and/or correct for errors in data stored in the cache.

The ECC logic 206 includes an encoder unit 222. Data 212A may be provided to the encoder unit. The encoder unit has check bit generation logic 224 to generate check bits 214A using, based on, or corresponding to the data 212A. In one or more embodiments, the check bit generation logic may represent or implement a generator matrix or G-matrix to generate the check bits. The check bits 214A may represent parity bits or redundant bits that may allow errors in the data to be corrected based on the well established principles of ECC. The encoder unit is coupled with the cache 204. The encoder unit may provide the data 212A and the corresponding check bits 214A to the cache, where they may be stored, for example in a cache line.

The ECC logic 206 also includes a decoder and correction unit 226. The decoder and correction unit may alternatively be split into a separate decoder unit and correction unit. The decoder and correction unit is coupled with the cache 204. Data 212A and corresponding check bits 214A from the cache may be provided to the decoder and correction unit as 212B and 214B, respectively. The decoder and correction unit may include decoder logic including check bit confirmation logic 228 to confirm that the check bits 214B and the data 212B are mutually consistent. In one or more embodiments, the check bit confirmation logic may represent or implement a parity check matrix or H-matrix. The check bit confirmation logic may check (e.g., calculate syndromes based on) the data and the check bits. Syndromes equal to zero may indicate that there are no errors in the data or check bits, whereas syndromes not equal to zero may indicate one or more errors (e.g., one or more bits of the data or check bits have an incorrect bit value). In such a case, the decoder and correction unit may include correction logic to perform error correction on the data and check bits. The check bits provide parity bits or redundant bits that allow such errors to be corrected, within certain limits, based on the well established principles of ECC. The data 212B, after error correction (if applicable), may be output from the decoder and correction unit. By way of example, this data may be provided to another cache, or to memory, or to processor core.

In embodiments of the invention, different ECC schemes and/or ECC schemes providing different strength, may have compatible, conforming, and/or shared check bit generation logic and/or compatible, conforming, and/or shared check bit checking logic, or both. For example, logic representing or implementing a portion of a matrix or other equation used to generate check bits and/or check the check bits for a first ECC scheme or first ECC logic (e.g., providing a lower level of protection) may be compatible, conforming, shared and/or identical to logic representing or implementing a portion of a matrix or other equation used to generate check bits and/or check the check bits for a second, different ECC scheme or second, different ECC logic (e.g., providing a higher level of protection).

In some embodiments, the ECCs having the compatible logic may be linear ECCs, such as linear cyclic ECCs. The linear ECCs may use the aforementioned generator matrix or G-matrix as check bit generation logic used to generate check bits or parity bits. The linear ECCs may also use the aforementioned parity check matrix or H-matrix to check the code words to see if the data has been corrupted. For example, the parity check matrix or H-matrix may compute syndromes using the data and check bits to determine if there are errors and correct the errors if they exist. Various different types of suitable linear ECCs are known in the arts. One prevalent type of suitable linear cyclic ECC scheme, which is commonly used to protect caches, is Bose-Chaudhuri-Hocquenghen (BCH) codes. Other linear polynomial codes are also suitable. Still other suitable codes include Orthogonal Latin Squares, and others known in the arts.

By way of example, in one or more embodiments, logic implementing or representing a sub-matrix of a G-matrix or generator matrix and/or logic implementing or representing a sub-matrix of an H-matrix or parity check matrix for a first ECC logic or scheme (e.g., a lower protection ECC logic or scheme), may be compatible with (e.g., check bit compatible with) logic implementing or representing a sub-matrix of a G-matrix or generator matrix and/or logic implementing or representing a sub-matrix of an H-matrix or parity check matrix for a second, different ECC logic or scheme (e.g., a higher protection ECC logic or scheme).

Figure 3A:
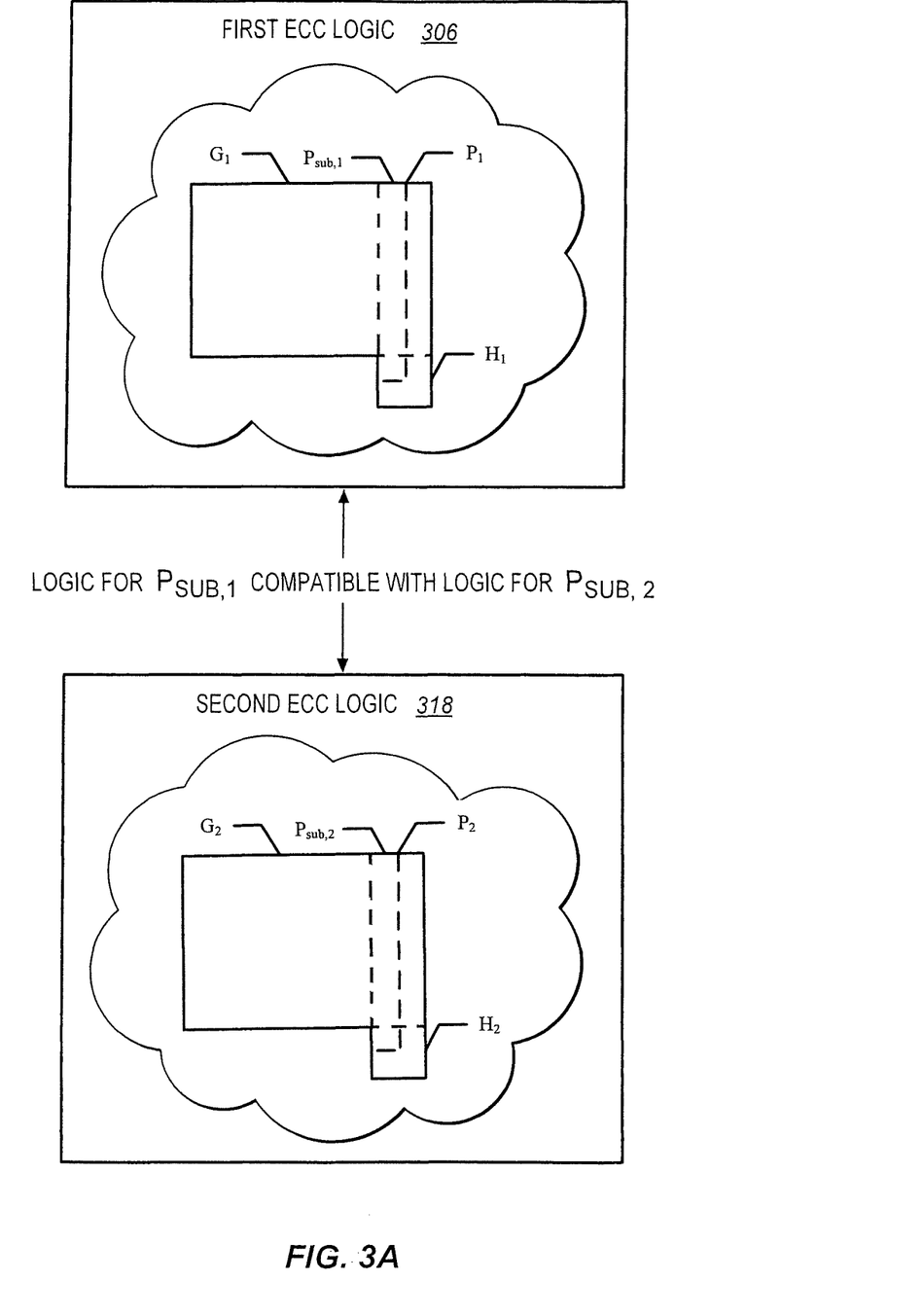
FIG. 3A conceptually illustrates an embodiment of a first ECC logic based on a first ECC scheme that represents or implements a first parity sub-matrix ($P_{sub,1}$) that is compatible with (e.g., check bit compatible with) a second parity sub-matrix ($P_{sub,2}$) that is represented or implemented with a second ECC logic of a second, different ECC scheme.

FIG. 3A conceptually illustrates an embodiment of a first ECC logic 306 based on a first ECC scheme that represents or implements a first parity sub-matrix ($P_{sub,1}$) that is compatible with (e.g., check bit compatible with) a second parity sub-matrix ($P_{sub,2}$) that is represented or implemented with a second ECC logic 318 of a second, different ECC scheme. The first parity sub-matrix ($P_{sub,1}$) is a sub-matrix of a first parity matrix ($P_1$), and the second parity sub-matrix ($P_{sub,2}$) is a sub-matrix of a second parity matrix ($P_2$). The first parity matrix ($P_1$) is shared between systematic forms of a first generator matrix ($G_1$) and a first parity check matrix ($H_1$). The second parity matrix ($P_2$) is shared between systematic forms of a second generator matrix ($G_2$) and a second parity check matrix ($H_2$). In one embodiment, the first parity sub-matrix ($P_{sub,1}$) may be identical to the second parity sub-matrix ($P_{sub,2}$). The first ECC and the second ECC may potentially have different strength or protection.

To further illustrate certain concepts, consider the following detailed example, although the scope of the invention is not limited to this particular example. The number of columns in the H-matrices is usually a power of 2 minus 1, such as, for example 127-bits, 255-bits, or 511-bits. In processors, the data width is often a power of 2, such as, for example, 64-bits, 128-bits, or 256-bits. When applying a certain H-matrix for a certain length of data, some extra columns are not needed and may be truncated to match the number of data bits (e.g., 256-bits) plus the number of check bits (e.g., 19-bits for DECTED or 10-bits for SECDED). For example, the H-matrix for DECTED may be truncated from a complete H-matrix with 511 columns to 275 columns (i.e., 275=256+19). Similarly, the H-matrix for SECDED may be truncated to 266 columns (i.e., 266=256+10). In other words, the complete H-matrices derived from ECC algorithm directly may have more columns than needed, and some may be selectively removed. The selection of columns may be performed relatively arbitrarily with freedom to select which columns to selectively remove.

Given an H-matrix (H) with proper size, there are multiple ways to construct the corresponding G-matrix (G). In some embodiments, the G-matrix (G) may be constructed such that the condition $G \times H^T = 0$ is satisfied, where the T represents a transpose. In one embodiment, the H-matrix may be transformed from a non-systematic form to a systematic form. In systematic form, the H-matrix and the G-matrix may share a common sub-matrix, namely a so-called P-matrix (P). The size of P is k by r, where k is the number of data bits, and r is the number of check bits. The H-matrix (H) may satisfy the equation $H = [P^T, I_r]$ and the G-matrix (G) may satisfy the equation $G = [I_x, P]$, where the $I_k$ and $I_r$ means identity matrix of size k and r. Thus, $G \times H^T = [I_K, P] \times [P^T, I_r]^T = [I_K \times P] + [P \times I_r] = (P+P) = 0$.

We can randomly pick s columns of P-matrix to form a sub-matrix named as $P_{sub}$, the condition still holds, i.e. $[I_K, P_{sub}] \times [P_{sub}^T, I_S]^T = (P_{sub} + P_{sub}) = 0$. This new matrix $[I_K, P_{sub}]$, let's called it $G_{sub}$, is apparently a sub-matrix of G. The same for $[P_{sub}^T, I_s]$, which is a sub-matrix of H, because identity matrix ($I_s$ and $I_r$) are inclusive by nature. If s equals to the number of check bits in SECDED, then $G_{sub}$ and $H_{sub}$ have the right matrix size for SECDED code. However, to satisfy the condition of $G \times H^T = 0$ alone is necessary, but not sufficient for $G_{sub}$ and $H_{sub}$ to be valid for SECDED. To be able to correct single-bit error, the columns vectors of $H_{sub}$ should be non-zero and distinct. This may help to provide that all single-error syndromes can be distinguished. To detect all double-bit errors, the sum of any two columns in $H_{sub}$ is not equal to a third column. This may help to prevent double-error aliasing. Therefore, in order to construct a valid SECDED from DECTED matrices, the selection of H-matrix columns and $P_{sub}$-matrix may be carefully selected. As a result, a Single Error Correction (SEC) code (9-bit of check bits) can be constructed from DECTED code. As a property of ECC, adding one parity bit can extend any SEC to a SECDED.

Accordingly, as described above, in one embodiment, a sub-matrix may be constructed from DECTED, such that $G_{sub} \times H_{sub}^T = 0$. The columns and rows may be arranged to make it a SEC.

As a result of the compatible logic described above, compatible or common check bits may be shared between and used by the ECC logic of different caches, even when the ECC logic of the different caches is based on different ECC schemes and/or provides different levels or degrees of error correction. Consequently, there is no need to re-generate these common check bits when exchanging data between caches, but rather these common check bits may be reused to reduce computations, power consumption, heat generation, etc.

Figure 3B:
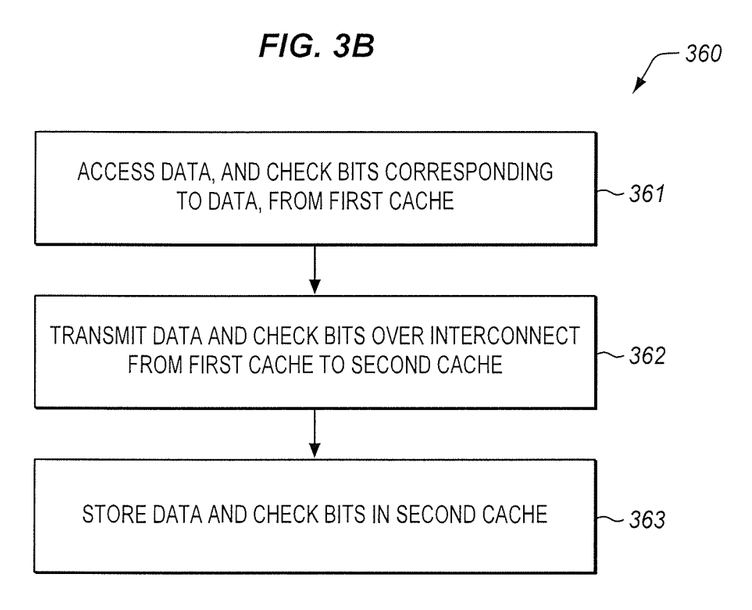
FIG. 3B is a block flow diagram of an embodiment of a method of exchanging data and also check bits corresponding to the data between caches.

FIG. 3B is a block flow diagram of an embodiment of a method 360 of exchanging data and also check bits corresponding to the data between caches. In one or more embodiments, the method may be performed by and/or within a processor or computer system. For example, in one or more embodiments, the method may be performed by and/or within the processor 100 of FIG. 1, or one similar. Alternatively, the method 220 may be performed by and/or within a processor entirely different than the processor of FIG. 1.

The method includes accessing data, and check bits corresponding to the data, from a first cache, at block 361. The data and the check bits are transmitted over a bus or other interconnect from the first cache to a second cache, at block 362. The data and the check bits are stored in the second cache, at block 363.

The ECC logic used by the first and second caches may be check bit compatible, at least with respect to the check bits transmitted on the bus. As a result, there is no need for the ECC logic corresponding to the second cache to have to regenerate the check bits. Rather, the ECC logic corresponding to the second cache may merely reused the already generated check bits and/or store them in second cache.

In embodiments, the first cache may be protected by a first ECC scheme that is different than a second ECC scheme used to protect the second cache. In some cases, the different ECC schemes may provide different levels of protection. Alternatively, the first and second ECC schemes may be the same.

Figure 4:
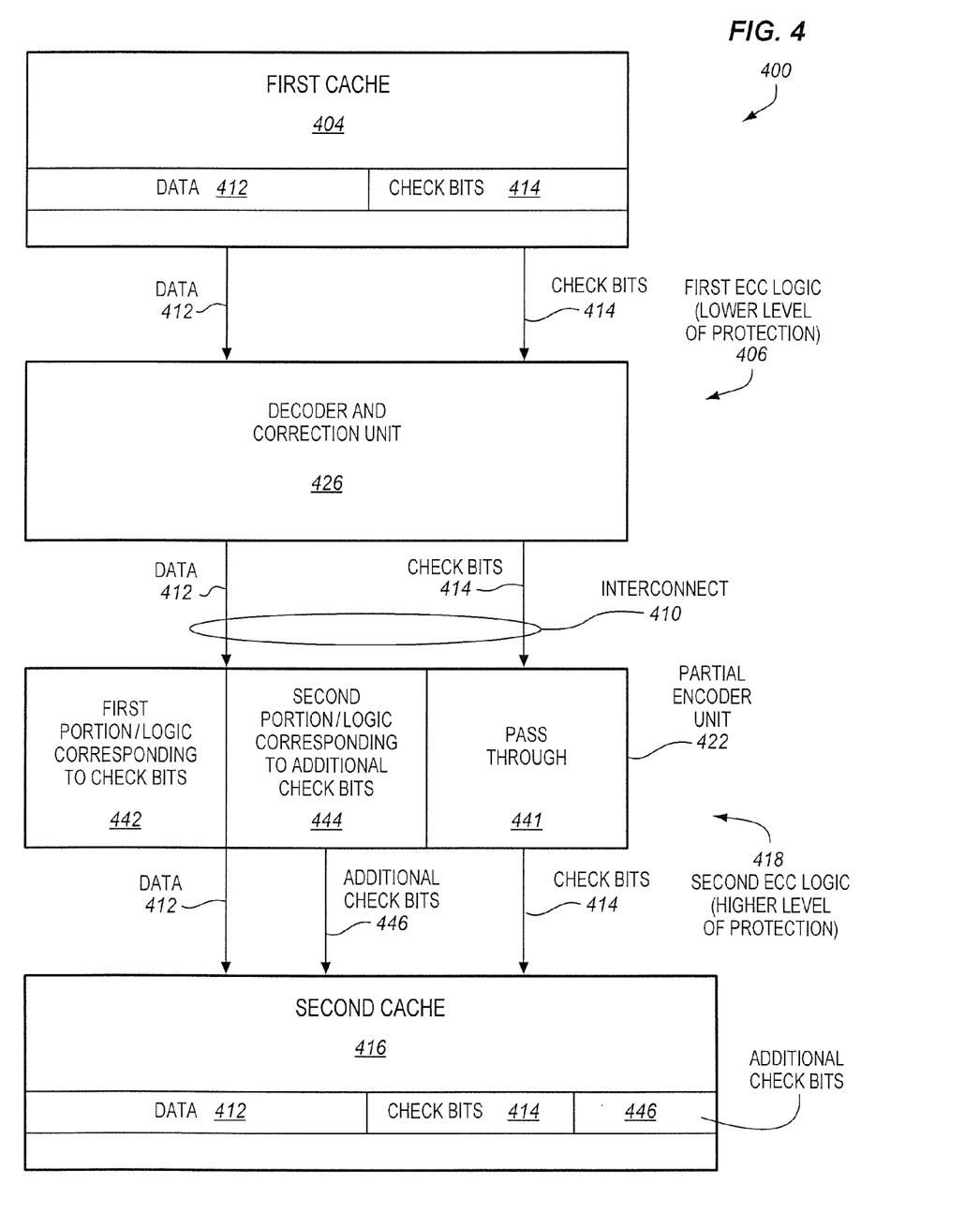
FIG. 4 is a block diagram illustrating an embodiment of processor operable to transfer data and also check bits corresponding to the data over an interconnect from a first cache having an associated first ECC logic providing a lower level of protection to a second cache having an associated second ECC logic providing a higher level of protection.

FIG. 4 is a block diagram illustrating an embodiment of processor 400 operable to transfer data 412 and also check bits 414 corresponding to the data over an interconnect 410 from a first cache 404 having an associated first ECC logic 406 providing a lower level of protection to a second cache 416 having an associated second ECC logic 418 providing a higher level of protection. In one or more embodiments, the processor 400 may perform the method of FIG. 3B, or one similar. However, it is to be understood that the processor 400 may perform operations and methods different than those shown in FIG. 3B.

In one or more embodiments, the first cache is relatively closer (e.g., at a closer level) to a given core than the second cache, and the first cache is relatively smaller than the second cache. In one aspect, the transfer of the data may be due to a replacement of a line in the first cache and a corresponding write of the data for that line to the second cache, although the scope of the invention is not so limited. Alternatively, the caches may be of the same size and at the same level.

The first cache 404 is operable to store data 412 and corresponding check bits 414 therein. The data and the check bits may be provided from the first cache to the first ECC logic 406. The first ECC logic may be based on a first ECC scheme, which provides the relatively lower level of protection. For example, in one particular embodiment, the first ECC logic/scheme may use lower-bit error correction/detection (e.g., Single-bit Error Correction Double-bit Error Detection (SECDED)), although this is not required. For the particular example of SECDED, if there are 256-bits of the data bits, there may be 10-bits of the check bits.

The first ECC logic 406 includes a decoder and correction unit 426. The decoder and correction unit may alternatively be split into a separate decoder unit and correction unit. The unit may be implemented in hardware (e.g., circuitry), firmware, software, or a combination thereof. The decoder and correction unit is coupled with the first cache to receive the data and the check bits. As previously described, the decoder logic of the decoder and correction unit may have check bit confirmation logic (not shown), for example representing or implementing an H-matrix or parity check matrix, to confirm that the check bits and the data are mutually consistent. For example, the check bit confirmation logic may calculate syndromes based on the data and the check bits, and the correction logic may correct any applicable errors.

The decoder and correction unit 426 is operable to transmit or otherwise provide the data 412 as output onto a cache bus, other bus, or other interconnect 410 that is coupled between the first cache 404 and the second cache 416. As shown, in one or more embodiments, the decoder and correction unit 426 is also operable to transmit or otherwise provide the check bits 414 as output onto the interconnect 410 that is coupled between the first cache 404 and the second cache 416. For example, in the particular case of SECDED, if there are 256-bits of the data 412, there may be 10-bits (or as will be discussed further below in some embodiments 9-bits) of the check bits 414 also transmitted. In one aspect, the interconnect may have enough lines or wires to transmit both the data and the check bits. For example, there may be a line or wire for each data bit and a line for each check bit.

In one embodiment, the interconnect 410 is the primary interconnect used to transfer data between the first and second caches. It may be a dedicated interconnect that is coupled directly between the first and second caches. In the case of the caches both being on-die caches, the interconnect may be an on-die bus or other on-die interconnect. In some cases, the interconnect may include more than one bus. For example, if one of the caches is on-die and the other is off-die, the interconnect may include a first on-die bus and a second off-die bus.

A partial encoder unit 422, of the second ECC logic, which is based on the second, different ECC scheme, is coupled with the cache bus or other interconnect 410. The partial encoder unit may be implemented in hardware (e.g., circuitry), firmware, software, or a combination thereof. The second ECC logic provides a relatively higher level of protection. For example, in one particular embodiment, the second ECC logic/scheme may use higher-bit error correction/detection (e.g., Double-bit Error Correction Triple-bit Error Detection (DECTED)), although this is not required. For DECTED, if there are 256-bits of the data bits, there may be 19-bits of the check bits.

The partial encoder unit 422 has a first portion or set of logic 442 corresponding to the check bits 414 and a second portion or set of logic 444 corresponding to a set of one or more additional check bits 446. In one aspect, the first portion or set of logic 442 may be capable of generating the check bits 414 using or based on the data 412. For example, the first portion or set of logic 442 may include check bit generator logic, for example representing or implementing at least a first portion of a G-matrix or generator matrix (e.g., a $P_{sub}$-matrix), which is capable of generating the check bits 414 using or based on the data. Similarly, in one aspect, the second portion or set of logic 444 may be capable of generating the set of one or more additional check bits 446 using or based on the data 412. For example, the second portion or set of logic 444 may include additional check bit generator logic, for example representing or implementing at least a second portion of the same G-matrix or generator matrix.

The partial encoder unit is a "partial" encoder unit because, in one or more embodiments, only a portion of the partial encoder unit may be needed or used. For example, in the illustrated embodiment, since the already-generated check bits 414 (e.g., the ten check bits in SECDED) are transmitted or otherwise provided over the interconnect to the partial encoder unit, the first portion or set of logic 442 (which corresponds to the check bits 414 and/or is capable of generating the check bits 414) is not needed and may not be used. This is due in part to the first portion or set of logic being check bit compatible, conforming, or shared with the corresponding check bit generator logic of the first ECC logic 406. The check bits 414 are a common set of check bits for the first and second ECC. The partial encoder unit 422 includes a pass through 441 (e.g., direct lines or wires bypassing the check bit generation logic) to pass the check bits through to the second cache.

Alternatively, in one or more other embodiments, the first portion or set of logic 442 may be needed and used. For example, the first portion or set of logic 442 may be used to generate the check bits 414 when they are not otherwise provided by another component, such as, for example, if the data comes from main memory or another cache, which do not use the same common set of check bits. The second portion or set of logic 444 may generate the set of one or more additional check bits 446 (e.g., the extra 9-bits used for DECTED that are not used for SECDED).

Conventionally, when different caches are protected by different ECC schemes, the ECC schemes are check bit independent of one another. In situations such as the illustrated embodiment, where the first and second caches are protected by different ECC schemes, the check bit confirmation logic of the first ECC logic 406, for example implementing a first H-matrix, would be check bit incompatible with the check bit generator logic of the second ECC logic 418, for example implementing an unrelated and incompatible G-matrix. As a result, conventionally the check bits 414 used by the decoder and correction unit of the first ECC logic 406 would be incompatible with and unusable by the second ECC logic 418. Accordingly, conventionally the check bits 414 used by the first ECC logic 406 would not be transmitted to the second ECC logic 418 over the interconnect 410. As a result, conventionally the second ECC logic 418 would need a full encoder unit, as opposed to the illustrated partial encoder unit 422, since all of the check bits used in the second encoding scheme would need to be generated within the second ECC logic (i.e., conventionally none of the check bits would be reused).

In one or more embodiments, power consumption of the processor and/or the partial encoder unit may optionally be reduced by reducing an amount of power to the first portion or set of logic 442 when it is not needed (e.g., when the check bits are received from the interconnect and may be reused). Reducing the power may include reducing a voltage, reducing a clock frequency, reducing both a voltage and a clock frequency, reducing the power partially but not entirely switching off the power, switching off the power entirely, etc. This may also help to reduce heat generation. Alternatively, if neither power consumption or heat generation need to be reduced for the particular implementation, then reducing the power need not be done.

Yet another option is to use the first portion or set of logic 442 to perform an ECC check (e.g., detect and correct errors) on incoming data. Since the G-matrix used in encoding and the H-matrix used in decoding share the common P-matrix, as illustrated in FIG. 3A, the encoder and decoder logic have much logic in common. Accordingly, the encoder logic may be used as decoder logic to perform the ECC check by encoding the incoming data and comparing with the incoming ECC check bits. Discrepancies indicate one or more errors.

Referring again to FIG. 4, the second cache 416 is coupled with the partial encoder unit 422. The second cache may receive the data 412, the check bits 414, and the additional check bits 446 from the partial encoder unit. The second cache is operable to store the data 412, the check bits 414, and the additional check bits 446 therein. The data 412 and the check bits 414 as stored in the second cache may be identical to the data 414 and the check bits 414 transmitted on the interconnect 410, as well as the data 412 and the check bits 414 stored in the first cache 404. In one embodiment, the transfer of the data may represent a line read from the second cache into the first cache.

An additional advantage of transmitting the check bits over the interconnect is improved ability to detect and correct errors introduced during the transmission of the data over the interconnect. The actual transmission of the data over the interconnect can introduce errors. Conventionally, no check bits or parity information is transmitted over the interconnect along with the data. Since there is no associated check bits or parity bits corresponding to the data, it is difficult to detect and correct these errors. However, in accordance with embodiments of the invention, the check bits are transmitted along with the corresponding data over the interconnect. As a result, errors introduced into either the data or the check bits may be detected and corrected using the existing parity or redundancy.

Figure 5:
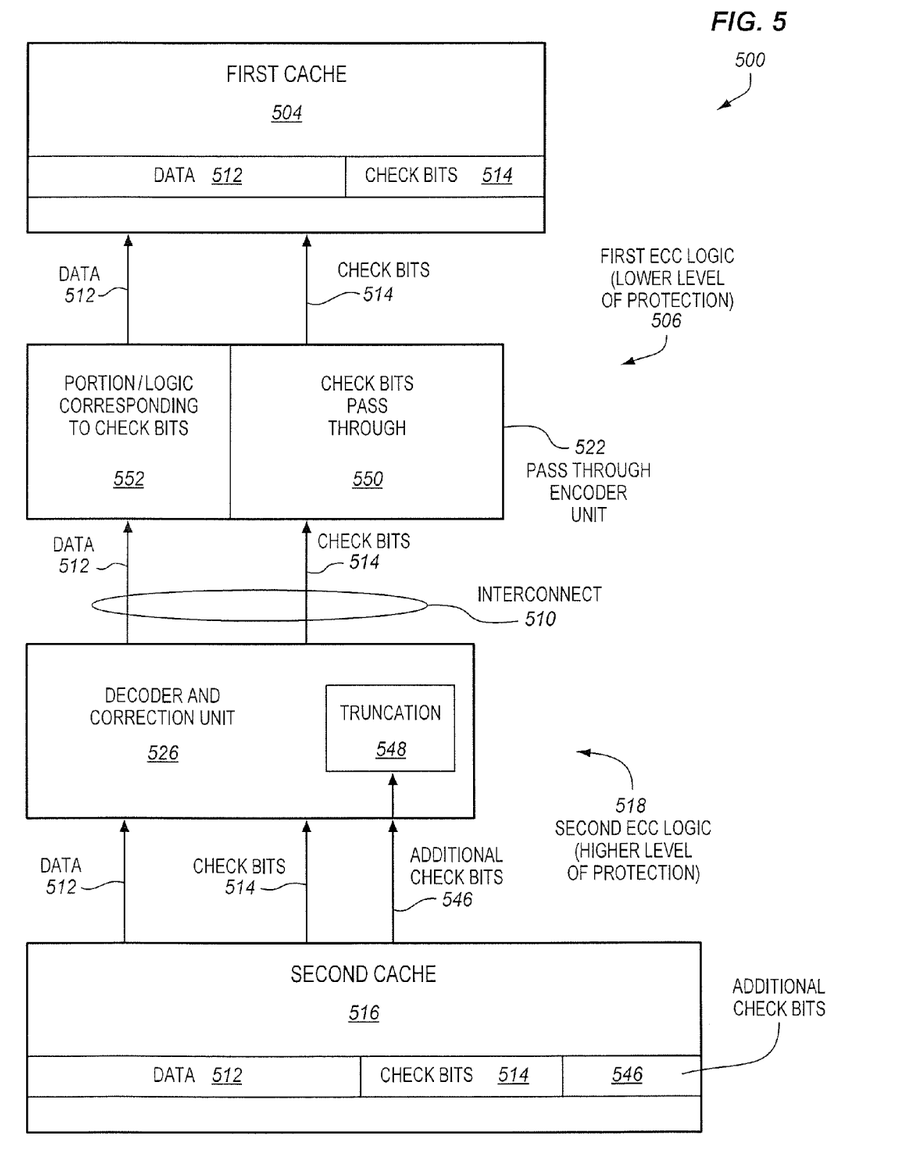
FIG. 5 is a block diagram illustrating an embodiment of processor operable to transfer data and also check bits corresponding to the data over an interconnect from a second cache having an associated second ECC logic providing a higher level of protection to a first cache having an associated first ECC logic providing a lower level of protection.

FIG. 5 is a block diagram illustrating an embodiment of processor 500 operable to transfer data 512 and also check bits 514 corresponding to the data over an interconnect 510 from a second cache 516 having an associated second ECC logic 518 providing a higher level of protection to a first cache 504 having an associated first ECC logic 506 providing a lower level of protection. In one or more embodiments, the processor 500 may perform the method of FIG. 3B, or one similar. However, it is to be understood that the processor 500 may perform operations and methods different than those shown in FIG. 3B.

In one or more embodiments, the first cache is relatively closer (e.g., at a closer level) to a given core than the second cache, and the first cache is relatively smaller than the second cache. In one aspect, the transfer of the data may be due to a replacement of a line in the first cache and a corresponding write of the data for that line to the second cache, although the scope of the invention is not so limited. Alternatively, the caches may be of the same size and at the same level.

The second cache 516 is operable to store data 512, corresponding check bits 546, and a set of one or more additional check bits 546 therein. The check bits 514 and the set of one or more additional check bits 546 collectively represent the check bits used for the second ECC scheme. The data 512, the check bits 514, and the additional check bits 546 may be provided from the second cache to the second ECC logic 518.

The second ECC logic 518 includes a decoder and correction unit 526. The decoder and correction unit may alternatively be split into a separate decoder unit and correction unit. The second ECC logic may also include the partial encoder unit 422 from FIG. 4. The decoder and correction unit is coupled with the second cache to receive the data 512, the check bits 514, and the additional check bits 546. The decoder logic of the decoder and correction unit may have check bit confirmation logic (not shown), for example representing or implementing an H-matrix or parity check matrix, to confirm that the data, the check bits, and the additional check bits are mutually consistent. For example, the check bit confirmation logic may calculate syndromes based on the data and the check bits, and the correction logic may correct any applicable errors, as previously described.

The decoder and correction unit 526 is operable to transmit or otherwise provide the data 512 as output onto a cache bus, other bus, or other interconnect 510 that is coupled between the first cache 504 and the second cache 516. As shown, in one or more embodiments, the decoder and correction unit is also operable to transmit or otherwise provide the check bits 514 as output onto the cache bus, other bus, or other interconnect 510 that is coupled between the first cache 504 and the second cache 516. In one embodiment, the interconnect 510 is the primary interconnect used to transfer data between the first and second caches. In one aspect, the interconnect may have enough lines to transmit the data and the check bits.

As previously mentioned, conventionally, in situations such as the illustrated embodiment, where the first and second caches are protected by different ECC schemes, the check bits 514 used by the second ECC logic 518 would be unusable by the first ECC logic 506. The first ECC logic would need to generate an entirely new set of check bits, rather than reusing any of the check bits. Accordingly, conventionally the check bits 514 would not be transmitted from the second ECC logic 518 to the first ECC logic 506 over the interconnect 510.

As also previously discussed, an additional advantage of transmitting the check bits over the interconnect is improved ability to detect and correct errors introduced during the transmission of the data over the interconnect. In accordance with embodiments of the invention, since the check bits are transmitted along with the corresponding data over the interconnect, errors introduced into either the data or the check bits may be detected and corrected.

The additional bits 546 used in the relatively higher level of protection ECC scheme of the second ECC logic, are not needed by the relatively lower level of protection ECC scheme of the first ECC logic. Accordingly, in one aspect, the additional bits 546 may not be transmitted over the interconnect 510. As shown, the decoder and correction unit 526 may have truncation 548 to truncate or otherwise remove the additional bits 546. In one aspect, the truncation may represent terminations of wires, lines, or other conductors carrying the additional bits 546. Accordingly, some but not all of the check bits used by the higher protection ECC scheme may be provided between the caches over the bus and reused by the lower protection ECC scheme.

A pass through encoder unit 522, of the first ECC logic 506, which is based on the first, relatively lower protection ECC scheme, is coupled with the interconnect 510. The pass through encoder unit may be implemented with hardware (e.g., circuitry), firmware, software, or a combination thereof. The first ECC logic may also include the decoder and correction unit 426 of FIG. 4. The pass through encoder unit 522 has a pass through 550 and a portion or set of logic 552 corresponding to the check bits 514. In one aspect, the portion or set of logic 552 may be capable of generating the check bits 514 using or based on the data 512. For example, the portion or set of logic 552 may include check bit generator logic, for example representing or implementing at least a portion of a G-matrix or generator matrix (e.g., a $P_{sub}$-matrix), which is capable of generating the check bits 514 using or based on the data.

In one or more embodiments, the portion or set of logic 552 of the pass through encoder unit 522 may or may not be needed and used, depending on whether or not the check bits 514 are already being provided to the pass through encoder unit. For example, in the illustrated embodiment, since the already-generated check bits are being provided over the interconnect to the pass through encoder unit, the portion or set of logic 552, does not need to be used to generate the check bits. In such an embodiment, the pass through 550 may instead pass the already-generated check bits to the first cache. The check bits are a common set of check bits for the first and second ECC logic/schemes. In such an embodiment, since the second ECC scheme provides higher protection, and a greater number of check bits, the pass through encoder unit may not need to generate any check bits or parity bits at all. Alternatively, in one or more other embodiments, the portion or set of logic 552 may be needed and used. For example, the portion or set of logic 552 may be used to generate the check bits 514 when they are not otherwise provided by another component, such as, for example, if the data comes from main memory or another cache, which do not use the same common set of check bits. Also, the portion or set of logic 514 may be used to protect the data from ring.

In one or more embodiments, power consumption of the processor 500 and/or the pass through encoder unit may optionally be reduced by reducing an amount of power to the portion or set of logic 552 when it is not needed. Reducing the power may include reducing a voltage, reducing a clock frequency, reducing both a voltage and a clock frequency, reducing the power partially but not entirely switching off the power, switching off the power entirely, etc. This may also help to reduce heat generation. Alternatively, if neither power consumption or heat generation need to be reduced for the particular implementation, then reducing the power need not be done.

Referring again to FIG. 5, the first cache 504 is coupled with the pass through encoder unit 522. The second cache may receive the data 512 and the check bits 514 from the partial encoder unit. The first cache is operable to store the data 512 and the check bits 514. The data and the check bits as stored in the first cache may be identical to the data 512 and the check bits 514 transmitted on the interconnect 510, as well as the data 512 and the check bits 514 previously stored in the second cache 516.

The embodiments of FIGS. 4 and 5 show first and second ECC logics that are based on different ECC schemes providing different levels of protection, although the scope of the invention is not so limited. In other embodiments, the first and second ECC logics may be based on different ECC schemes providing the same level of protection. In another embodiment, the first and second ECC logics may be based on the same ECC scheme providing the same level of protection. In the later embodiment, all check bits may be common and reused between the first and second ECC logics based on the same ECC scheme.

As previously mentioned, to detect all double-bit errors, the columns may be selected such that the sum of any two columns in $H_{sub}$ is not equal to a third column. This may help to prevent double-error aliasing. Therefore, in order to construct a valid SECDED from DECTED matrices, the selection of H-matrix columns and $P_{sub}$-matrix may be carefully selected. As a result, a Single Error Correction (SEC) code (9-bit of check bits) can be constructed from DECTED code. As a property of ECC, adding one parity bit can extend any SEC to a SECDED. When the columns are selected appropriately, all of the bits for SECDED may be reused by DECTED, including the single parity bit used.

Alternatively, in another embodiment, this added single parity bit may not be shared or common between the two ECC logics, but rather the higher protection logic may generate this extra single parity bit. This approach is similar to what is described above in FIG. 4 with a few exceptions. In this approach, one check bit less than the total number of check bits 414 used by the first ECC logic 406, may be reused by the second ECC logic. For example, recall that in the case of SECDED with 256-bits of data, there are 10-bits of check bits. In the approach of FIG. 4, all 10-bits may be common to and shared by the first and second ECC logics. However, in the present approach, rather than all 10-bits being shared or reused, only 9-bits of these 10-bits would be shared or reused by the second ECC logic 418 employing the higher protection DECTED. Accordingly, in one aspect, only one check bit less than the total number of check bits 414 used by the first ECC logic 406 (e.g., 9-bits instead of 10-bits) may be transmitted over the interconnect 410 and shared or reused by the second ECC logic 418. It is to be appreciated that the extra tenth bit could optionally be transmitted over the interconnect 410, if desired, but it would not be used for ECC by the second ECC logic 418. Rather, the second ECC logic would generate an additional single parity bit in addition to the additional check bits 446 generated in the approach of FIG. 4. For example, recall that in the case of DECTED with 256-bits of data, there are 19-bits of check bits. Accordingly, if only 9-bits of the 10-bits of check bits used by the first ECC logic 406 are shared or reused by the second ECC logic 418, then rather than the second ECC logic 418 or partial encoder unit 422 generating only 9-bits of check bits 446, the second ECC logic 418 or partial encoder unit 422 may generate 10-bits of check bits. The 10-bits generated by the partial encoder unit 422 may include the 9-bits of check bits 446, plus the additional single parity bit. This approach still allows a significant amount of reuse of the check bits (e.g., approximately 90% of the check bits used by the lower protection ECC scheme may be reused).

Now consider a comparison of this approach to the approach described above for FIG. 5. Again, in this approach, one check bit less than the total number of check bits 514 used by the first ECC logic 506 may be shared or reused between the first and second ECC logics. For example, as described immediately above, only 9-bits of the 10-bits of check bits 514 may be reused by both of the second ECC logic 518 employing DECTED and the first ECC logic 506 employing SECDED. The pass through encoder unit 522 may pass these 9-bits of shared check bits from the interconnect 510 to the first cache 504 as previously described. However, rather than the portion or logic 552 and/or the pass through encoder 522 generating zero additional check bits as in the approach of FIG. 5, the portion or logic 552 and/or the pass through encoder 522 may instead generate the single additional check bit. Again, this approach still allows a significant amount of reuse of the check bits.

Accordingly, generating the additional single parity bit is one option, but is not required. It is often possible through appropriate selection of the columns to reuse all bits of the lower ECC protection scheme. This is especially true for smaller data sizes, for example below about 256-bits (e.g., 128-bits, 64-bits, 32-bits, 16-bits, or 8-bits), where it is more likely that the columns may be selected appropriately, there being more columns to choose from and truncate from the starting matrix. Additionally, in one embodiment, the same error correction scheme may be used for both the first and second set of ECC logic used to protect the different caches, and generating this additional parity bit is not needed when the same error correction scheme is used for both of the caches.

Figure 6:
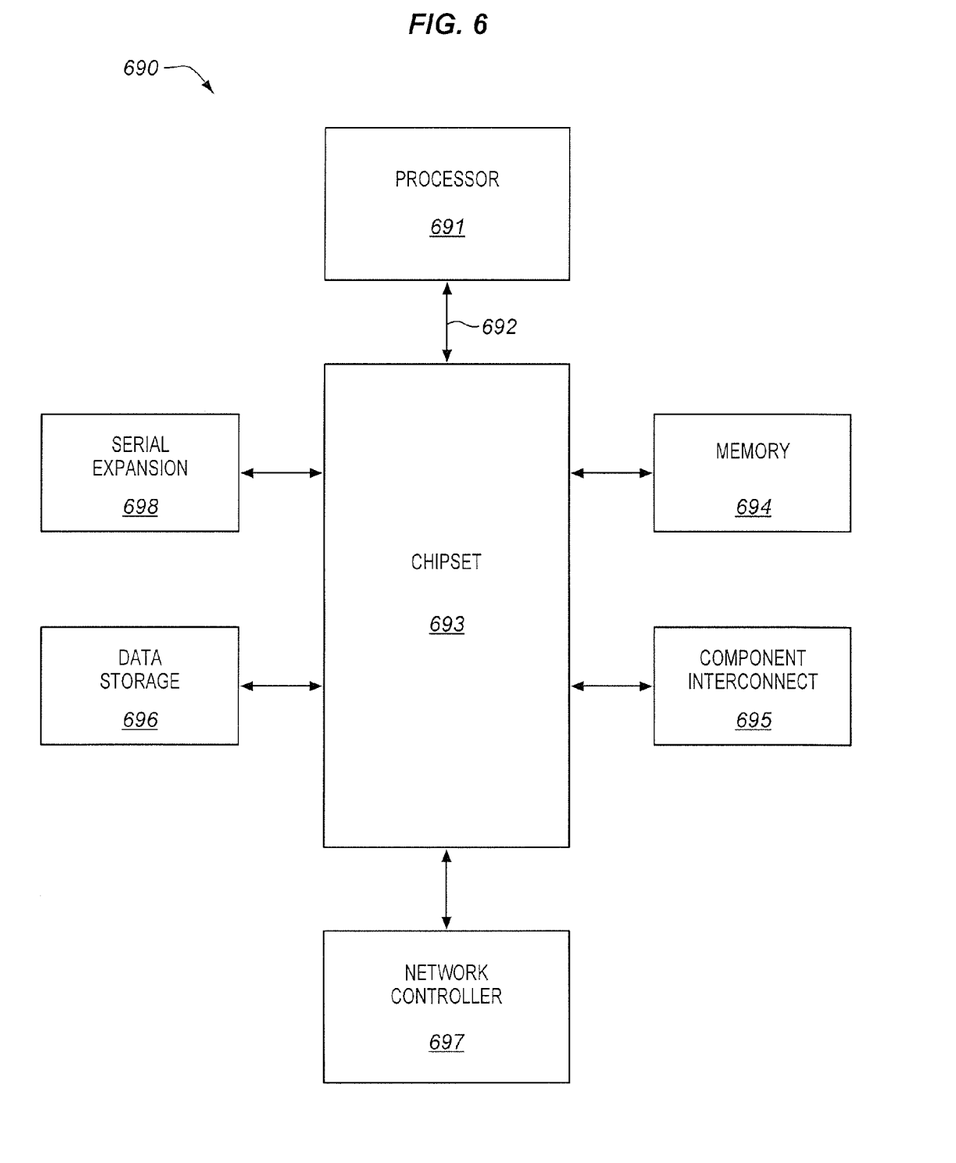
FIG. 6 is a block diagram of an example embodiment of a suitable computer system or electronic device incorporating a processor having caches protected by common or compatible ECC logic.

Still other embodiments pertain to a system (e.g., a computer system or other electronic device) having a processor having caches as disclosed herein and/or performing a method as disclosed herein. FIG. 6 is a block diagram of an example embodiment of a suitable computer system or electronic device 690.

The computer system includes a processor 691. In one or more embodiments, the processor may include a first cache, a first ECC logic for the first cache, a second cache, a second ECC logic for the second cache, and an interconnect coupled between the first and second caches and operable to transmit data and also check bits corresponding to the data.

The processor may have one or more cores. In the case of a multiple core processor, the multiple cores may be monolithically integrated on a single integrated circuit (IC) chip or die. In one aspect, each core may include at least one execution unit and at least one cache. The processor may also include one or more shared caches.

The processor is coupled to a chipset 693 via a bus or other interconnect 692. The interconnect may be used to transmit data signals between the processor and other components in the system via the chipset.

A memory 694 is coupled to the chipset. In various embodiments, the memory may include a random access memory (RAM). Dynamic RAM (DRAM) is an example of a type of RAM used in many but not all computer systems.

A component interconnect 695 is also coupled with the chipset. In one or more embodiments, the component interconnect may include one or more peripheral component interconnect express (PCIe) interfaces. The component interconnect may allow other components to be coupled to the rest of the system through the chipset. One example of such components is a graphics chip or other graphics device, although this is optional and not required.

A data storage 696 is coupled to the chipset. In various embodiments, the data storage may include a hard disk drive, a floppy disk drive, a CD-ROM device, a flash memory device, a dynamic random access memory (DRAM), or the like, or a combination thereof.

A network controller 697 is also coupled to the chipset. The network controller may allow the system to be coupled with a network.

A serial expansion port 698 is also coupled with the chipset. In one or more embodiments, the serial expansion port may include one or more universal serial bus (USB) ports. The serial expansion port may allow various other types of input/output devices to be coupled to the rest of the system through the chipset.

A few illustrative examples of other components that may optionally be coupled with the chipset include, but are not limited to, an audio controller, a wireless transceiver, and a user input device (e.g., a keyboard, mouse). In one or more embodiments, one or more of these (e.g., a wireless transceiver) may be coupled with the chipset.

In one or more embodiments, the computer system may execute a version of the WINDOWS™ operating system, available from Microsoft Corporation of Redmond, Wash. Alternatively, other operating systems, such as, for example, UNIX, Linux, or embedded systems, may be used.

This is just one particular example of a suitable computer system. Other system designs and configurations known in the arts for laptops, desktops, handheld PCs, personal digital assistants, engineering workstations, servers, network devices, network hubs, switches, video game devices, set-top boxes, and various other electronic devices having processors, are also suitable. In some cases, the systems may have multiple processors.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

In the description above, for the purposes of explanation, numerous specific details have been set forth in order to provide a thorough understanding of the embodiments of the invention. It will be apparent however, to one skilled in the art, that one or more other embodiments may be practiced without some of these specific details. The particular embodiments described are not provided to limit the invention but to illustrate embodiments of the invention. The scope of the invention is not to be determined by the specific examples provided above but only by the claims below. In other instances, well-known circuits, structures, devices, and operations have been shown in block diagram form or without detail in order to avoid obscuring the understanding of the description. Where considered appropriate, reference numerals or terminal portions of reference numerals have been repeated among the figures to indicate corresponding or analogous elements, which may optionally have similar characteristics.

Various operations and methods have been described. Some of the methods have been described in a basic form in the flow diagrams, but operations may optionally be added to and/or removed from the methods. In addition, while the flow diagrams show a particular order of the operations according to example embodiments, it is to be understood that that particular order is exemplary. Alternate embodiments may optionally perform the operations in different order, combine certain operations, overlap certain operations, etc. Many modifications and adaptations may be made to the methods and are contemplated.

It should also be appreciated that reference throughout this specification to "one embodiment", "an embodiment", or "one or more embodiments", for example, means that a particular feature may be included in the practice of embodiments of the invention. Similarly, it should be appreciated that in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects may lie in less than all features of a single disclosed embodiment. Thus, the claims following the Detailed Description are hereby expressly incorporated into this Detailed Description, with each claim standing on its own as a separate embodiment of the invention.

What is claimed is:

1. An apparatus comprising:
   a first cache;
   a first error correction code (ECC) logic to use a first ECC scheme for the first cache;
   a second cache;
   a second ECC logic to use a second, different ECC scheme for the second cache, wherein the second ECC logic provides a higher level of protection than the first ECC logic;
   an interconnect coupled with the first cache and the second cache; and
   logic to transmit data and also check bits corresponding to the data over the interconnect,
   in which the check bits are to be used by the first ECC logic that is to use the first ECC scheme and also by the second ECC logic that is to use the second, different ECC scheme, wherein both the first and second ECC logic are to use the check bits that are to be transmitted over the interconnect,
   wherein the first ECC logic is to generate the check bits using the data, wherein the second ECC logic comprises a partial encoder unit having a first portion that is capable of generating a set of bits identical in value to the check bits using the data and a second portion that is capable of generating additional check bits using the data, and wherein the apparatus is operable to reduce power to the first portion of the partial encoder without reducing power to the second portion of the partial encoder.

2. The apparatus of claim 1, wherein the first cache is to store the check bits prior to transmission of the check bits on the interconnect, and the second cache is to store the check bits after the transmission of the check bits on the interconnect.

3. The apparatus of claim 1, wherein the interconnect is to transmit the check bits to the second ECC logic, and wherein the second ECC logic comprises a decoder and correction unit, the decoder and correction unit operable to use the check bits and the data received from the interconnect to correct errors, including errors introduced into the data when transmitting the data on the interconnect.

4. An apparatus comprising:
a first cache;
a first error correction code (ECC) logic to use a first ECC scheme for the first cache;
a second cache;
a second ECC logic to use a second, different ECC scheme for the second cache, wherein the second ECC logic provides a higher level of protection than the first ECC logic;
an interconnect coupled with the first cache and the second cache; and
logic to transmit data and also check bits corresponding to the data over the interconnect,
in which the check bits are to be used by the first ECC logic that is to use the first ECC scheme and also by the second ECC logic that is to use the second, different ECC scheme, wherein both the first and second ECC logic are to use the check bits that are to be transmitted over the interconnect
wherein the second ECC logic is to generate the check bits using the data, and wherein the first ECC logic comprises a pass through encoder unit having a portion that is capable of generating a set of bits identical in value to the check bits using the data and a pass through to pass the check bits through to the first cache.

5. The apparatus of claim 4, wherein the apparatus is operable to reduce power to the portion of the pass through encoder when the check bits are received from the interconnect.

6. The apparatus of claim 4, wherein the check bits transmitted on the interconnect include, at least, one less than a number of check bits used by the first ECC scheme.

7. The apparatus of claim 4, wherein the first ECC logic uses a linear code in which a generator matrix and a parity check matrix each have a systematic form, and wherein the second ECC logic uses a linear code in which a generator matrix and a parity check matrix each have a systematic form.

8. The apparatus of claim 7, wherein each of the parity check matrices have all column vectors non-zero and distinct.

* * * * *